Aug. 30, 1966   J. K. MILLS   3,270,273
REVERSIBLE CURRENT SUPPLY
Filed May 21, 1962   2 Sheets-Sheet 1

INVENTOR
J. K. MILLS
BY
R.B. ...
ATTORNEY

Aug. 30, 1966 J. K. MILLS 3,270,273
REVERSIBLE CURRENT SUPPLY
Filed May 21, 1962 2 Sheets-Sheet 2

INVENTOR
J. K. MILLS
BY
R. B. Ardin
ATTORNEY

United States Patent Office 3,270,273
Patented August 30, 1966

3,270,273
REVERSIBLE CURRENT SUPPLY
John K. Mills, Morristown, N.J., assignor to Bell Telephone Laboratories, Incorporated, New York, N.Y., a corporation of New York
Filed May 21, 1962, Ser. No. 196,157
2 Claims. (Cl. 321—47)

This invention relates to a reversible current supply and more particularly to a reversible current supply which utilizes controlled rectifiers.

The controlled rectifier is a semiconductor device which has an anode, a cathode and a control electrode. The device operates much in the manner of a semiconductor diode in that it represents a low impedance when forward biased but acts as a high impedance when reverse biased. Conduction of current through a controlled rectifier differs from conduction through a diode, however, in that it is not initiated by the anode-cathode bias alone but, rather, is initiated by a bias applied to the control electrode. For further information on this device the reader is referred to the paper, "A Silicon Controlled Rectifier—Its Characteristics and Rating—I," D. K. Bisson and R. F. Dyer, paper 58-1248, American Institute of Electrical Engineers.

Lately, many so-called "reversible current supplies" have used controlled rectifiers to switch the direction of current. A reversible current supply is one which is capable of passing current in both a forward and a reverse direction. An application of such a supply may, for example, include driving a heat pump so that current through the heat pump in one direction causes the heat pump to increase the ambient temperature while current through the heat pump in the opposite direction causes it to lower the ambient temperature.

In a typical circuit configuration of a known reversible current supply, the rectifiers are connected in parallel with the cathode electrode of one rectifier connected to the anode electrode of the other. This parallel combination is connected in series with the load and source of alternating potential. In operation, when one rectifier is turned, or gated, on (that is, placed in its low impedance state) it will pass current in one direction (from its anode to its cathode). When the other rectifier is turned on and the first rectifier is off (that is, in its high impedance state) the current will flow in the opposite direction since the rectifiers are connected in opposition to one another.

The disadvantages attendant upon this type of circuit configuration are readily apparent. A source which utilizes ground as its reference cannot be used to turn the rectifiers on. The use of a single-ended source as a means of gating a rectifier into the low impedance state would require the cathode of that rectifier to be grounded. A ground applied to the cathode of one rectifier would mean that the anode of the other rectifier would be grounded, thus rendering the second rectifier useless. That is, the anode of the second rectifier would always be at zero potential. Hence, only a floating potential can be utilized as the gating source in this type of circuit and precautions are necessary to insulate this source against the possibility of accidental grounding. It is further to be noted that the peak inverse voltage the rectifiers can withstand when they are in the off state is that value associated with each individual rectifier.

Accordingly, the primary object of the present invention is to permit the control rectifiers of a reversible current supply to be gated on by a single-ended source.

A further object of this invention is to permit the controlled rectifiers of a reversible current supply to withstand a peak inverse voltage which is equal to the sum of the peak inverse voltages each rectifier individually can withstand.

In furtherance of the above objects the present invention contemplates the use of a series circuit comprising at least two controlled rectifiers, each by-passed by an oppositely poled asymmetrically conducting device such as a semiconductor diode. The anode electrodes of the rectifiers are connected to one another through a source of alternating potential and the load. When the first rectifier is gated on it becomes a half-wave rectifier and passes current in one direction through the load. Since the second rectifier is in the high impedance (or off) state, the current flows through the diode which is connected in parallel with this rectifier. When the second rectifier is gated on it becomes a half-wave rectifier and passes current in the opposite direction through the load. As noted above, this current is by-passed about the first rectifier by the diode connected in parallel with it.

Thus, by utilizing the circuit described above, the objects of this invention are accomplished in that each rectifier may be gated on by a single-ended source. The grounding of the cathode electrode of one rectifier does not affect the anode electrode of the other rectifier. Furthermore, since the controlled rectifiers are in series, the peak inverse voltage the rectifiers can withstand is equal to the sum of their individual peak inverse voltages rather than the peak inverse voltage of one alone.

The above and other features of the invention will be more clearly understood from a consideration of the following detailed description taken in conjunction with the drawings wherein.

Figure 1:
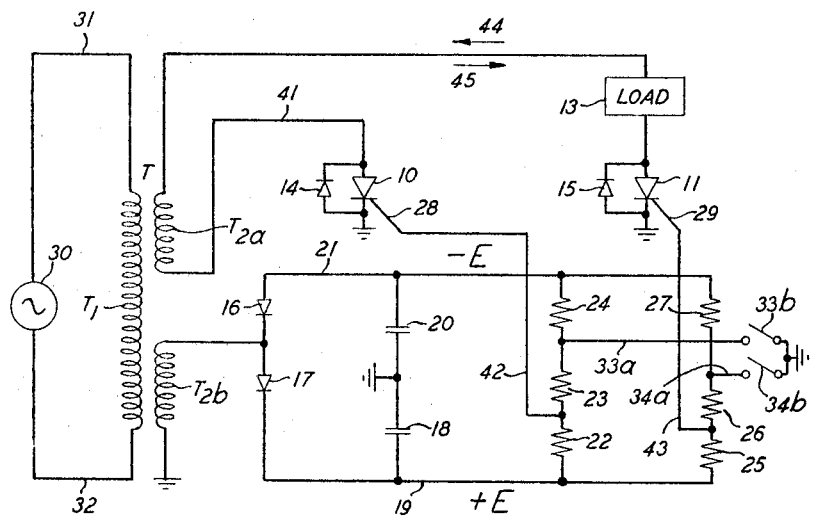
FIG. 1 is a schematic diagram illustrating the reversible current supply of the present invention.

FIG. 1 shows the anode electrode of a controlled rectifier 10 connected to the anode electrode of a controlled rectifier 11 through a series circuit comprising the secondary winding $T_{2a}$ of a transformer T and a load 13 by means of a lead 41. The cathode electrodes of rectifiers 10 and 11 are connected to ground. The anode electrode of a diode 14 is connected to the cathode electrode of rectifier 10 and the cathode electrode of diode 14 is connected to the anode electrode of controlled rectifier 10. Similarly, the anode electrode of a diode 15 is connected to the cathode electrode of rectifier 11 and the cathode electrode of diode 15 is connected to the anode electrode of rectifier 11.

The secondary winding $T_{2b}$ of transformer T is connected between ground and the junction of the diodes 16 and 17. Diode 17 is connected to a capacitor 18 by means of a lead 19. Diode 16 is connected to a capacitor 20 by a lead 21. The junction of capacitors 18 and 20 is connected to ground. Two voltage divider networks are connected across leads 19 and 21 and comprise the series connected resistors 22, 23, and 24 and the series connected resistors 25, 26 and 27. The control electrode 28 of controlled rectifier 10 is connected to the junction of resistors 22 and 23 by a lead 42. The control electrode 29 of rectifier 11 is connected to the junction of resistors 25 and 26 by a lead 43. A control lead 33a is connected to the junction of resistors 23 and 24 and a control lead 34a is connected to the junction of resistors 26 and 27. Switch 33b is connected between lead 33a and ground. Likewise, switch 34b is connected between lead 34a and ground. The primary winding $T_1$ of transformer T is connected to a source of varying potential such as an A.-C. source 30 by the leads 31 and 32.

It is to be noted that if the control electrodes of the rectifiers are connected to a gating circuit similar to that described in the preceding paragraph, the resistance of resistor 22 must be greater than the total resistance of resistors 23 and 24. Likewise, the resistance of resistor 25 must be greater than the total resistance of resistors 26 and 27. (The reason for this limitation is fully explained in subsequent paragraphs.) However, the invention is not to be thought of as being limited by the arrangement shown for initiating conduction of either rectifier 10 or 11, as these rectifiers may be controlled by any suitable method.

As explained hereinafter, the operation of either switch 33b or 34b initiates operation of the current supply of the present invention. Hence, this circuit may be advantageously utilized in battery power plants since it is customary in such plants to control the output of a charging generator or rectifier by grounding one of its two leads.

Diodes 16 and 17 and capacitors 18 and 20 comprise a full-wave rectifier and filtering network. The A.-C. potential across transformer secondary $T_{2b}$ is rectified by the diodes 16 and 17 to place a potential on leads 19 and 21 in such a manner that the potential on lead 19 is positive with respect to ground while the potential on lead 21 is negative with respect to ground. These potentials are indicated as $+E$ and $-E$ in FIG. 1. Since, as noted above, the resistance of resistor 22 is greater than the total resistance of resistors 23 and 24, a negative potential exists at the junction of resistors 23 and 22, thereby placing a negative potential on control electrode 28 through lead 42. For the same reason a negative potential likewise exists on control electrode 29 through lead 43. For this set of conditions rectifiers 10 and 11 are in the off, or high impedance, state thereby effectively preventing current introduced by $T_{2a}$ from reaching the load. Furthermore, such current cannot reach the load through diodes 14 or 15 for the reason that when one diode is biased into its low impedance state the other diode is in its high impedance state.

If it is now desired to pass current through the load in the direction indicated by the arrow 44, switch 33b may be operated to ground lead 33a. This action causes a positive potential to exist at the junction of resistors 22 and 23 (since the total negative potential exists only across resistor 24) which is transmitted to electrode 28 by means of lead 42. Thus, when the potential at the anode electrode of rectifier 10 is positive with respect to the cathode electrode, current flows through rectifier 10.

Figure 2A:
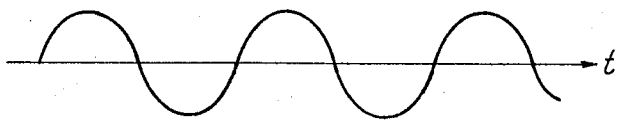
FIGS. 2A, 2B and 2C illustrate the waveforms which occur in the circuit of FIG. 1 under different conditions.

The voltage generated by source 30 and appearing across transformer secondary $T_{2a}$ is illustrated in FIG. 2A. It is to be noted that a positive potential exists at the anode electrode of rectifier 10 only during negative half cycles of the waveform shown in FIG. 2A. Hence, during the negative portion of the waveform shown in FIG. 2A, current flows from $T_{2a}$ through rectifier 10, diode 15, which is now biased into its low impedance state by the positive voltage appearing at its anode electrode, and load 13. The current waveform through load 13 therefore is that shown by the solid lines in FIG. 2B and the energy transmitted to load 13 is represented by the shaded area shown therein. Hence, by the application of a proper bias to electrode 28, which is accomplished by means of a single-ended source as described above, current is made to flow through the load 13 in the direction indicated by arrow 44.

If it is desired to pass current in the direction indicated by the arrow 45 in FIG. 1, switch 33b is opened and switch 34b operated, thereby connecting lead 34a to ground. This action causes a positive potential to exist at the junction of resistors 25 and 26 (for the reason stated in the preceding paragraph), thereby causing the positive potential to be applied to control electrode 29 through lead 43. Thus rectifier 11 now conducts when the anode electrode of the rectifier is positive with respect to its cathode electrode. It may be observed, by reference to FIG. 2A, that this condition occurs only during positive half cycles of the voltage introduced by $T_{2a}$. Hence, current flows through load 13, rectifier 11, and diode 14, which is now biased into its low impedance state, during the positive half cycles. Thus, the current through load 13 takes the wave shape depicted by the solid lines in FIG. 2C and the energy transmitted to load 13 is that represented by the shaded area in FIG. 2C. As noted above, current is made to flow through load 13 in the direction indicated by arrow 45 by the application of a proper bias to electrode 29. It is to be noted that the bias is provided, in accordance with this invention, by a single-ended source.

The current through load 13 may be reversed by simply grounding either one of two leads 33a and 34a. However, the invention is not to be thought of as being limited to the exact configuration shown in FIG. 1, since the alternating or varying source of potential 30 does not necessarily have to be a sine wave generator, nor need the transformer be used, as the source may be connected directly in series with the load. Furthermore, as noted above, the gating circuitry is shown by way of example only.

Figure 2B:
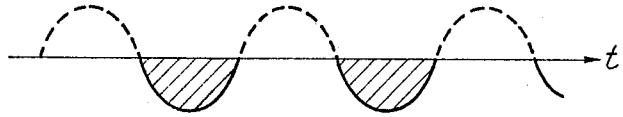
Figure 2C:
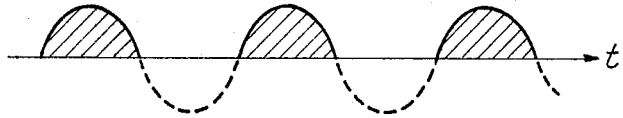
Figure 3:
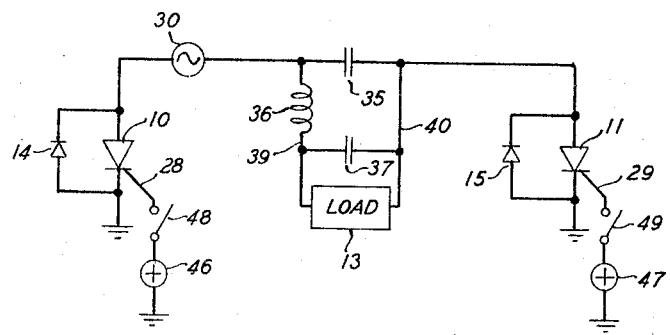
FIG. 3 is a schematic diagram of the reversible current supply of the present invention further modified by a filter arrangement.

For many applications it may be desirable to apply a filtered waveform to the load rather than the waveforms shown in FIGS. 2B and 2C. Thus, the embodiment shown in FIG. 3 discloses an arrangement for filtering the energy applied to the load. The source 30, shown in FIG. 3, is connected directly in series with the rectifiers rather than being introduced by means of a transformer as shown in FIG. 1. Furthermore, in furtherance of the objects of the present invention, control electrodes 28 and 29 are connected to the single-ended biasing sources 46 and 47, respectively, through the respective switches 48 and 49.

A capacitor 35, as shown in FIG. 3, is connected between source 30 and rectifier 11. A parallel circuit comprising capacitor 37 and load 13 is connected in parallel with capacitor 35 by leads 39 and 40. An inductor 36 is connected in lead 39 between capacitor 37 and the parallel circuit including capacitor 37 and load 13.

Figure 4A:
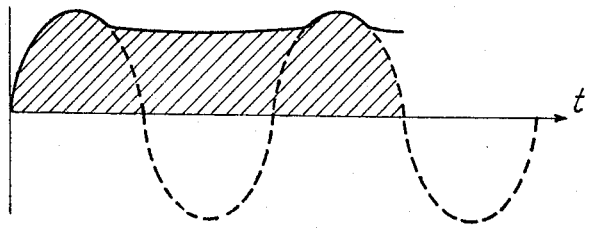
FIGS. 4A and 4B illustrate the waveforms occurring in the circuit of FIG. 3 under various circumstances.
Figure 4B:
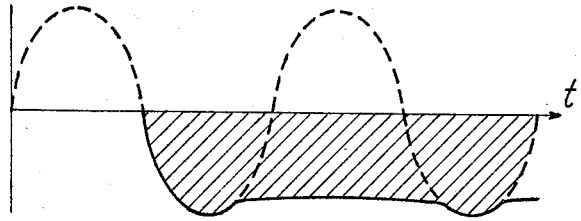

Capacitors 35 and 37 and inductor 36 constitute a $\pi$-type low-pass filter. The operation of the circuit illustrated in FIG. 3 is substantially similar to that shown in FIG. 1 with the following exception. When rectifier 11 in FIG. 3 is gated on by operation of switch 49, current flows through inductor 36 and load 13 to charge capacitors 35 and 37. Hence, the waveform of the voltage appearing at the load 13 takes the shape shown in FIG. 4A. The energy applied to the load is represented by the shaded area in FIG. 4A. Likewise the energy applied to load 13 when controlled rectifier 10 is gated on, by operation of switch 48, is represented by the shaded area shown in FIG. 4B, due to the action of the filter.

The foregoing description describes preferred embodiments of a reversible current supply which utilizes controlled rectifiers as the switching elements and wherein the rectifiers can be operated by single-ended biasing sources. The objects of the invention are accomplished by placing the controlled rectifiers in series opposition and providing current paths about the rectifiers in directions which are opposite to the directions of current flow through the rectifiers. It is to be understood, however, that modifications within the capabilities of one skilled in the art may be made without departing from the spirit and scope of the invention.

What is claimed is:

1. A bilateral switching circuit comprising a pair of controlled rectifiers each having an anode, cathode, and control electrode and each being capable of being switched between a high and a low impedance state, means joining said cathode electrodes together, an asymmetrically conducting device connected to bypass oppositely directed current about each of said controlled rectifiers, means connecting each of said asymmetrically conducting devices individually to the anode and cathode electrodes of a different one of said controlled rectifiers, a first series circuit comprising a load and a low-pass filter, a source of alternating potential, means connecting said source and said first series circuit in series to form a second series circuit, means connecting said second series circuit between the anode electrodes of said controlled rectifiers, and means connected to the control electrodes of each of said controlled rectifiers and adapted to control conduction of said controlled rectifiers.

2. In a reversible current supply, a pair of controlled rectifiers each having an anode, cathode, and control electrode and being capable of being switched between a high and a low impedance state, a pair of asymmetrically conducting devices each having an anode and a cathode electrode, means connecting the anode electrode and cathode electrode of each of said asymmetrically conducting devices individually to the cathode electrode and anode electrode, respectively, of different ones of said controlled rectifiers, a series circuit comprising a source of alternating potential, a load, and a low-pass filter, means connecting said series circuit between the anode electrodes of said controlled rectifiers, means connecting the cathode electrodes of said controlled rectifiers together, and means connected to the control electrodes of each of said controlled rectifiers to regulate conduction thereof.

References Cited by the Examiner

UNITED STATES PATENTS

| | | | |
|---|---|---|---|
| 2,719,258 | 9/1955 | Rich | 321—8 X |
| 3,022,454 | 2/1962 | Millis | 321—47 |
| 3,070,739 | 12/1962 | Hansen | 307—88.5 |
| 3,097,314 | 7/1963 | Harriman | 307—88.5 |

FOREIGN PATENTS

| | | |
|---|---|---|
| 1,121,167 | 1/1962 | Germany. |
| 176,133 | 9/1961 | Sweden. |

JOHN F. COUCH, *Primary Examiner.*

LLOYD McCOLLUM, *Examiner.*

A. J. GAJARSA, M. WACHTELL, *Assistant Examiners.*